United States Patent [19]

Keiser

[11] 4,281,739
[45] Aug. 4, 1981

[54] DAMPING BODY FOR MACHINE SUPPORT ARRANGEMENTS

[75] Inventor: Emil Keiser, Ebikon, Switzerland

[73] Assignee: Inventio AG, Hergiswil, Switzerland

[21] Appl. No.: 138,154

[22] Filed: Apr. 7, 1980

[30] Foreign Application Priority Data

May 18, 1979 [CH] Switzerland .......................... 4654/79

[51] Int. Cl.³ .......................... F16F 7/00; F16M 11/24
[52] U.S. Cl. .................................. 181/207; 248/188.2; 248/632; 248/638
[58] Field of Search .......................... 181/175, 207–209; 248/188.2, 615, 632, 638

[56] References Cited

U.S. PATENT DOCUMENTS

| 3,030,730 | 4/1962 | Costar | 248/188.2 |
| 4,114,845 | 9/1978 | Weisenberger | 248/615 |

FOREIGN PATENT DOCUMENTS

| 2424516 | 6/1975 | Fed. Rep. of Germany | 248/188.2 |
| 2441882 | 3/1976 | Fed. Rep. of Germany | . |
| 2516129 | 10/1976 | Fed. Rep. of Germany | 248/188.2 |

*Primary Examiner*—L. T. Hix
*Assistant Examiner*—Thomas H. Tarcza
*Attorney, Agent, or Firm*—Werner W. Kleeman

[57] ABSTRACT

A damping body composed of two substantially parallel, oppositely situated support surfaces for supporting a machine mounting base or foundation frame and for contact with a machine pedestal or socket arrangement. To obtain a uniform damping of sound and vibrations and to achieve a certain leveling of the machine mounting base, the damping body comprises at least two substantially wedge-shaped partial bodies which, in their unloaded state, can be shifted relative to one another along parting surfaces which are not in parallelism with the support surfaces. The damping body may be particularly advantageously employed for mounting elevator drive machines or the like.

3 Claims, 5 Drawing Figures 4,281,739

DAMPING BODY FOR MACHINE SUPPORT ARRANGEMENTS

BACKGROUND OF THE INVENTION

The present invention relates to a new and improved construction of a damping body for machine support arrangements. More particularly, the damping body of the present development is of the type which is at least partially formed of a material which dampens sound and oscillations or vibrations and contains two essentially parallel, oppositely situated support surfaces serving for supporting, as the case may be, the machine mounting base or foundation frame and for contact with a machine pedestal or socket arrangement or the like.

It is conventional practice to arrange damping bodies between the machine mounting bases and machine pedestals, in order to attenuate the propagation of sound and the vibrations caused by the machines when placed into operation. Such damping installations are an absolute necessity when the relevant machine or equipment is located internally of residential or public buildings. Thus, for instance, in the case of elevator or lift installations there exists the requirement that the drive or conveying machine, generally installed above the last storey of the building or structure, be secured to a mounting base or frame or a base plate which is separated from the support pedestal or the like by separation elements formed of rubber or other elastic damping material, in order to thus protect the building from the effects of sound and vibrations or oscillations. German Patent Publication No. 2,441,882 discloses one such arrangement of separation elements.

Such damping bodies usually consist of one-piece, square elements which are at least partially fabricated from elastic damping material. These elements are arranged below the machine mounting base or frame in different numbers and orientation, depending upon the weight distribution.

Yet, with such damping bodies it is difficult, however, during the installation work to achieve an exact leveling of the machine mounting base, and thus, the different machine components which are supported by the mounting base or frame. Hence, it is necessary to either arrange a plurality of damping bodies of different sizes and thicknesses, or to place one or a number of shims or underlayers between individual damping bodies and the frame, or, if necessary, the pedestal or the like. Since the shims, of necessity, must be relatively thin, they must be formed of metal or another, however appreciably harder material than that of the damping bodies, so that in their loaded condition they retain their original thickness and are not squeezed together and damaged. The arrangement of damping bodies having different damping characteristics below the same mounting base additionally is not particularly suitable for attaining a uniform weakening or attenuation of the transmission of sound and vibrations.

SUMMARY OF THE INVENTION

Therefore, with the foregoing in mind it is a primary object of the present invention to provide a new and improved construction of a damping body for machine support arrangements which is not afflicted with the aforementioned drawbacks and limitations of the prior art proposals and as heretofore discussed.

Another more specific object of the present invention aims at providing a relatively simple damping body for machine support arrangements, enabling a relatively exact leveling of the machine mounting base or frame and capable of realizing an essentially uniform sound and vibration damping, without the need to use damping bodies of different sizes and thicknesses or incorporating shims or the like.

Yet a further significant object of the present invention is to provide a new and improved construction of damping body for machine support arrangements which is relatively simple in design, economical to manufacture, extremely easy to use, not readily subject to breakdown or malfunction, and allows attainment of the above indicated advantages while avoiding the limitations heretofore discussed.

Now in order to implement these and still further objects of the invention, which will become more readily apparent as the description proceeds, the damping body of the present development is manifested by the features that it comprises at least two substantially wedge-shaped partial bodies which are separated from one another by separation or parting surfaces which are not dispositioned in parallelism with respect to the support surfaces. These partial bodies, in the unloaded state of the damping body, can be displaced relative to one another along such separation or parting surfaces.

According to a further feature of the invention each parting or separation surface of the wedge-shaped partial bodies contains parallel ribs extending transversely with respect to the displacement direction. By means of these ribs the wedge-shaped partial bodies engage in a positive or form-locking fashion with one another.

The invention also contemplates forming at least one of the wedge-shaped partial bodies of a suitable elastic damping material and in which there is incorporated a metallic plate. The wedge-shaped partial bodies can be advantageously constructed so as to be identical in shape and size.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
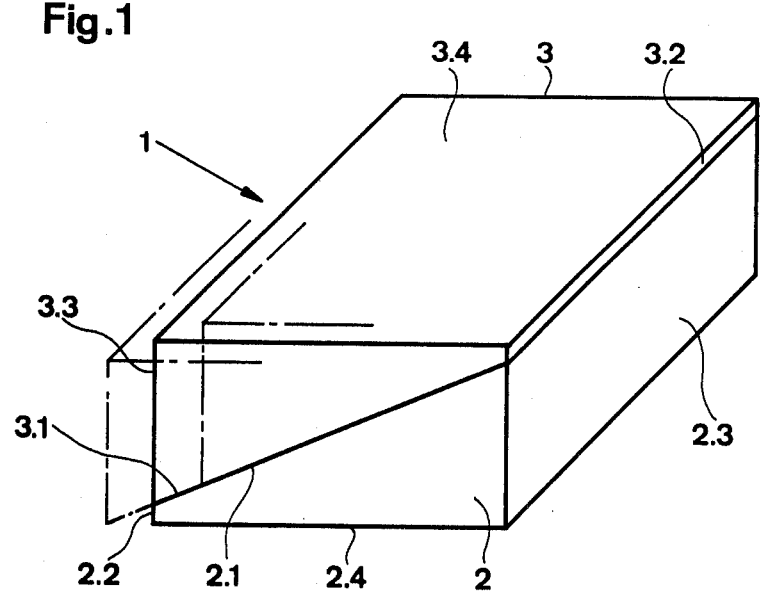
FIG. 1 is a side perspective view of a first exemplary embodiment of damping body in a simplified constructional form.

Describing now the drawings, the damping body or damping body arrangement 1, shown by way of example in FIG. 1, will be seen to comprise two substantially wedge-shaped, hexahedral partial bodies 2 and 3 which are identical in size and shape. Each partial body 2 and 3 is formed of any suitable sound and oscillation or vibration damping material, typically for instance rubber or elastic plastics. Each partial body 2 and 3 will be seen to possess throughout its entire length an essentially right-angled trapezoidal profile or sectional shape which remains uniform throughout. The surfaces 2.1 and 3.1 of the wedge-shaped partial bodies 2 and 3, respectively, are arranged in overlying or interfaced relationship. These surfaces 2.1 and 3.1 define parting or separation surfaces and are not perpendicular or orthogonal to the side surfaces 2.2, 2.3 and 3.2, 3.3 of the related wedge-shaped partial body 2 and 3. The upper partial body 3 is turned through about 180° in relation to the lower partial body 2. Thus, the surfaces 2.4 and 3.4 of the partial bodies 2 and 3, which surfaces are essentially perpendicular to the side or lateral surfaces 2.2, 2.3 and 3.2 and 3.3 of the related partial bodies 2 and 3, respectively, form, for the damping body 1, two parallel support or contact surfaces for supporting a machine mounting base or frame and for contact with a machine pedestal or socket arrangement or equivalent structure.

Due to the arrangement of two substantially wedge-shaped partial bodies 2 and 3, whose two superimposed arranged surfaces 2.1 and 3.1 constitute the parting of separation surfaces and which surfaces 2.1 and 3.1 are not in parallelism with the contact or support surfaces 2.4 and 3.4, the damping body 1 forms a parallelepiped structure. In the unloaded state of the damping body 1, it is possible, by accomplishing a relative displacement in the transverse direction of both partial bodies 2 and 3 along the parting or separation surfaces 2.1 and 3.1, respectively, to alter the thickness of the damping body 1, and thus, to thereby beneficially realize an exact leveling of the machine mounting base during its installation upon a pedestal or socket, as will be explained more fully hereinafter in conjunction with FIG. 2.

Figure 2:
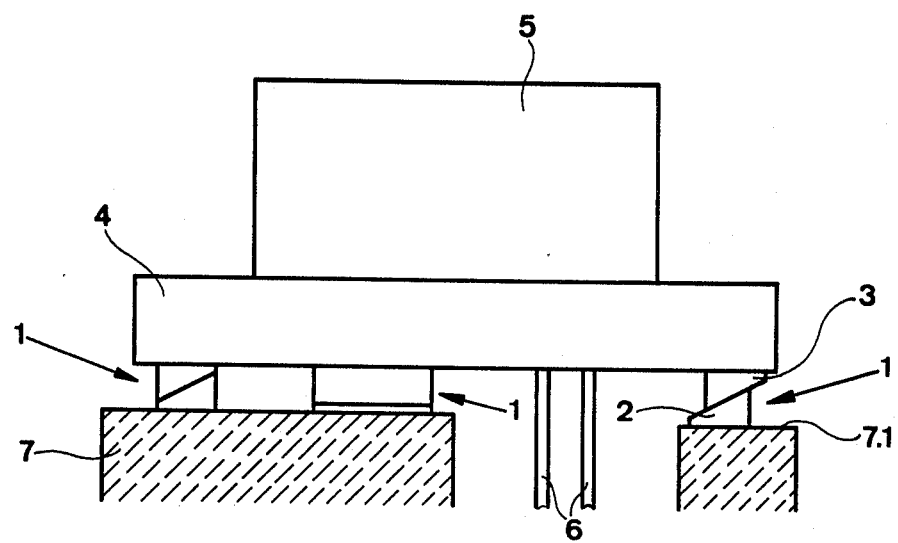
FIG. 2 is a schematic illustration showing the arrangement of a machine mounting base or frame upon a pedestal or socket arrangement with the aid of damping bodies of the type shown in FIG. 1.

Turning attention now to FIG. 2, there is schematically illustrated therein the use of such damping bodies 1, purely by way of example and not limitation, in an elevator or lift installation. The conveying or drive machine 5 which serves as the drive for the not particularly illustrated elevator cabin, by means of the conveying or drive cable 6, is attached to a metallic frame or mount base 4. The metallic frame or mount base 4 bears, by means of a number of damping bodies 1, upon a concrete pedestal or socket 7 or the like which is installed at the upper portion of the building or structure. From the illustration of FIG. 2 it will be apparent that it is possible to compensate for any slight level differences of the pedestal portion 7.1, by relatively displacing or shifting both of the wedge-shaped partial bodies 2 and 3 of the corresponding damping body 1.

Figure 3:
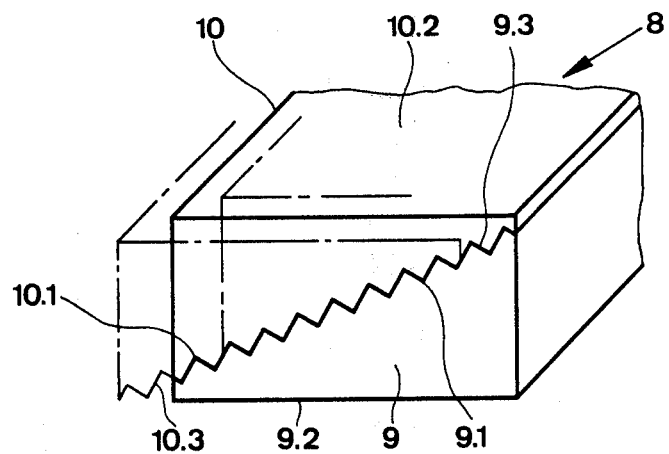
FIGS. 3 and 4 respectively show, in fragmentary view, two further modifications of the damping body illustrated in FIG. 1.

Continuing, with the modification of damping body 8 illustrated in FIG. 3, it will be seen that here also the damping body 8 likewise consists of two substantially wedge-shaped partial bodies 9 and 10, substantially identical in size and shape to the partial bodies of the damping body 1 of FIG. 1 discussed above, subject to the following observations. In this embodiment each of the parting or separation surfaces 9.1 and 10.1 of the partial bodies 9 and 10, and which parting or separation surfaces are not disposed in parallelism with respect to the contact or support surfaces 9.2 and 10.2, possesses a series of parallel and equidistant substantially V-shaped ribs or teeth-like elements 9.3 and 10.3. These ribs 9.3 and 10.3 of the partial bodies 9 and 10 extend transversely with respect to the direction of displacement of the partial bodies 9 and 10, and thus, render possible locking or positive interengagement of these partial bodies 9 and 10 with one another.

These equidistantly arranged ribs 9.3 and 10.3, the distribution of which is preferably small, i.e. amounts to a few millimeters, not only enable an exact and positive leveling when mounting the frame or mounting base, such as the mounting base 4 of FIG. 2, upon the pedestal such as the pedestal 7 of such FIG. 2, but also enable avoiding, particularly in the case where there are used lighter machines, the danger of relative shifting of the partial bodies 9 and 10 when the damping body 8 is under load.

Figure 4:
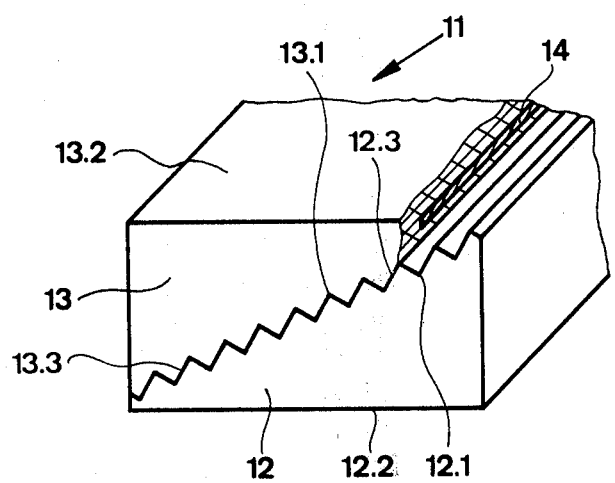

In the variant arrangement of FIG. 4 both of the superimposed partial bodies 12 and 13 of the damping body 11 have the same construction as the partial bodies 9 and 10 of the previously discussed damping body 8 of FIG. 3, and their parting or separation surfaces 12.1 and 13.1 here also have substantially V-shaped ribs or teeth-like elements 12.3 and 13.3, respectively. At the region of the support or contact surfaces 12.2 and 13.2 and parallel thereto, with this modification, each of the partial bodies 12 and 13 is provided with a plate member 14 which is incorporated therein, for instance formed of steel sheet metal.

The metallic plate 14 which is embedded in the elastic damping material, imparts to the related partial body 9 or 10, as the case may be, a certain rigidity or stiffness. Additionally, such metallic plate 14 assumes the function of a reflection surface which dampens or reflects the sonic energy which is transmitted through solid bodies, and thus, renders possible a good sound insulation.

Figure 5:
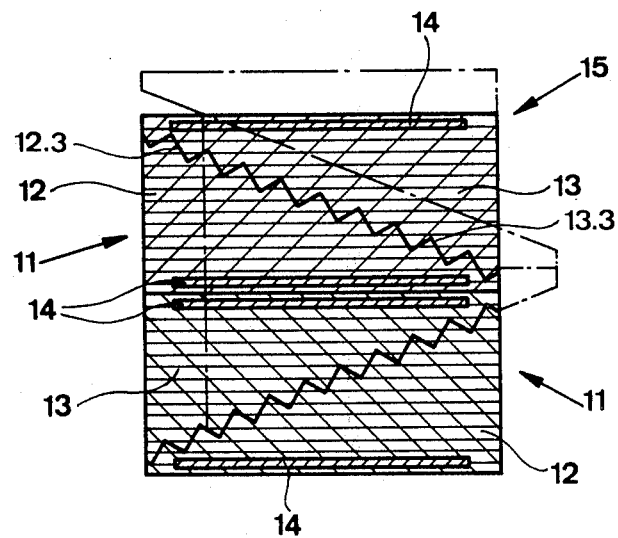
FIG. 5 is a cross-sectional view through a damping body constructed according to a further embodiment of the invention.

The further embodiment of damping body or damping body arrangement 15, illustrated in cross-sectional view in FIG. 5, will be seen to comprise two superimposed damping bodies 11, which, like those disclosed above in conjunction with the description of FIG. 4, each comprise two partial bodies 12 and 13 provided with substantially V-shaped ribs 12.3 and 13.3 and the metallic plates 14. Such arrangement affords two possibilities of adjusting the thickness of the damping body 15, something particularly advantageous whenever there is a need to compensate for relatively large level differences. As illustrated in FIG. 5, one of both damping bodies 11 is turned or rotated through 180° with respect to the other damping body in a horizontal plane, so that during the adjustment operation there is also afforded the possibility to only displace the intermediate or outer partial bodies 12 and 13 of the damping body 15.

One of the noteworthy advantages which can be realized with the invention particularly resides in the fact that, the use of a single type of wedge-shaped partial body enables providing identical damping bodies which can be adjusted as to their thickness, by means of which there can be obtained a uniform stroke, and thus, a uniform natural frequency of all of the contact or support points for the supported machine mount bases or frames.

Although for reasons of fabrication costs, storage and installation, the use of a single type of wedge-shaped partial body appears to be most favorable, it is also possible to provide other embodiments of the invention. Thus, for instance, it is possible to utilize damping bodies which possess two or more wedge-shaped partial bodies, which among themselves have different sectional shapes and/or sizes and can be completely or partially fabricated of different materials. The two intermediate partial bodies 12 and 13 of the damping body 15, shown by way of example in FIG. 5, could be formed of a single element, with or without the metallic plates or inserts 14. Also, each damping body could be provided, apart from wedge-shaped partial bodies, with one or a number of other elements, for instance square-shaped elements which are arranged upon the machine pedestal and/or below the machine mount base or frame or between wedge-shaped partial body pairs.

While there are shown and described present preferred embodiments of the invention it is to be distnctly understood that the invention is not limited thereto, but may be otherwise variously embodied and practised within the scope of the following claims. Accordingly,

What I claim is:

1. A damping body for machine support arrangements comprising:
   at least two superimposed substantially wedge-shaped partial bodies formed of elastic damping material and defining two substantially parallel and mutually oppositely situated support surfaces respectively serving for supporting a machine mount base and bearing upon a machine pedestal;
   said wedge-shaped partial bodies containing separation surfaces, dispositioned in nonparallel relationship with respect to said support surfaces;
   said wedge-shaped partial bodies being shiftable relative to one another along said separation surfaces in the unloaded condition of said damping body; and
   at least one of said partial bodies being provided with a metallic plate member embedded in said elastic damping material in a position substantially parallel to said support surfaces defined by said wedge-shaped partial bodies of the damping body, to dampen or reflect sonic energy.

2. The damping body as defined in claim 1, wherein:
   each separation surface of the related substantially wedge-shaped partial body possesses parallel rib means extending transversely with respect to the direction of displacement of the relatively shiftable partial bodies; and
   said rib means positively interengaging said wedge-shaped partial bodies with one another.

3. The damping body as defined in claim 1, wherein:
   said substantially wedge-shaped partial bodies are essentially identical in shape and size.

* * * * *